(12) United States Patent
Ash, Jr. et al.

(10) Patent No.: US 8,560,029 B2
(45) Date of Patent: Oct. 15, 2013

(54) ISOLATION ENHANCEMENT BETWEEN PLANAR ANTENNA ELEMENTS

(75) Inventors: Daniel R. Ash, Jr., Laguna Nigel, CA (US); Daniel R. Ash, Sr., Drain, OR (US); Jeremy Monroe, Trabuco Canyon, CA (US)

(73) Assignee: Mobile Joose, Inc, Lake Forest, CA (US)

(*) Notice: Subject to any disclaimer, the term of this patent is extended or adjusted under 35 U.S.C. 154(b) by 0 days.

(21) Appl. No.: 13/591,171

(22) Filed: Aug. 21, 2012

(65) Prior Publication Data

US 2013/0069839 A1 Mar. 21, 2013

Related U.S. Application Data

(63) Continuation-in-part of application No. 13/238,894, filed on Sep. 21, 2011, now Pat. No. 8,248,314, and a continuation-in-part of application No. 13/590,053, filed on Aug. 20, 2012, and a continuation-in-part of application No. 13/591,152, filed on Aug. 21, 2012.

(51) Int. Cl.
*H04M 1/00* (2006.01)
*H01Q 1/24* (2006.01)

(52) U.S. Cl.
USPC ............... 455/575.7; 455/562.1; 343/702

(58) Field of Classification Search
USPC ......... 455/562.1, 575.7, 77, 87, 575.5, 575.1, 455/19, 13.1; 343/841, 702
See application file for complete search history.

(56) References Cited

U.S. PATENT DOCUMENTS

| | | | |
|---|---|---|---|
| 6,624,789 B1* | 9/2003 | Kangasvieri et al. | 343/702 |
| 7,295,160 B2* | 11/2007 | Purr et al. | 343/700 MS |
| 7,616,158 B2* | 11/2009 | Mak et al. | 343/700 MS |
| 2001/0051537 A1 | 12/2001 | Nakamura et al. | |
| 2002/0154066 A1 | 10/2002 | Barna et al. | |
| 2005/0088345 A1 | 4/2005 | DeLa Torre Barreiro et al. | |
| 2006/0052112 A1 | 3/2006 | Baussi et al. | |
| 2007/0218951 A1 | 9/2007 | Risheq et al. | |
| 2010/0075595 A1 | 3/2010 | DeMarco et al. | |
| 2012/0139805 A1* | 6/2012 | Yu et al. | 343/770 |

* cited by examiner

*Primary Examiner* — Sonny Trinh
(74) *Attorney, Agent, or Firm* — Patent Law & Venture Group; Gene Scott

(57) ABSTRACT

An antenna system for creating mutual radiation isolation between planar antenna elements over a narrow band uses field cancellation. Adjacent planar antenna elements are positioned in a common ground plane within a mobile phone repeater station, A tuned slot element is positioned between the antenna elements and coupled to share ground plane current in order to maximize cancellation and minimize degradation of the radiation of the antenna elements. The dimensions of the toned slot element are adjusted to obtain lambda/2 resonance, whereby, isolation of more than 10 dB is attained between the antenna elements.

5 Claims, 2 Drawing Sheets

ISOLATION ENHANCEMENT BETWEEN PLANAR ANTENNA ELEMENTS

RELATED APPLICATIONS

This application is a Continuation-in-part of co-pending non-provisional application Ser. Nos. 13/238,894 filed on Sep. 21, 2011, and 13/590,053, filed on Aug. 21, 2012, and 13/591,152, filed on Aug. 21, 2012, and claims international date priority thereof. The subject matter of these priority applications is hereby incorporated herein by reference in their entirety.

BACKGROUND

This disclosure relates to the field of wireless communication and more particularly to antenna signal reception and emission. In the circuit of a repeater station, for instance, a pair of antennas are used and there may be poor signal isolation between them causing poor operation. Current circulating in any antenna induces currents in ail others that may be nearby. One can postulate a mutual impedance $z_{12}$ between two antennas that has the same significance as the jωM in ordinary coupled inductors. The mutual impedance $z_{12}$ between two antennas is defined as:

$$Z_{12} = \frac{v_2}{i_1}$$

where $i_1$ is the current flowing in antenna 1 and $v_2$ is the voltage that would have to be applied to antenna 2 with antenna 1 removed in order to produce the current in antenna 2 that was produced by antenna 1. From this definition, the currents and voltages applied in a set of coupled antennas are:

$$v_1 = i_1 Z_{11} + i_2 Z_{12} + \ldots + i_n Z_{1n}$$
$$v_2 = i_1 Z_{21} + i_2 Z_{22} + \ldots + i_n Z_{2n}$$
$$\vdots \quad \vdots \quad \vdots \quad \vdots$$
$$v_n = i_1 Z_{n1} + i_2 Z_{n2} + \ldots + i_n Z_{nn}$$

where:
$v_i$ is the voltage applied to the antenna
$z_{ii}$ is the impedance of antenna i and
$z_{ij}$ the mutual impedance between, antennas i and j
Note that, as in the case for mutual inductances, $z_{ij}=z_{ji}$ If some of the elements are not active, as is the case in television antennas, the corresponding $v_i$ are zero. Those elements are called parasitic elements and are unpowered elements that either reflect or absorb and reradiate RF energy. In some geometrical settings, the mutual impedance between antennas can be zero. This is the case for crossed dipoles used in circular polarisation antennas. However, there is a need for an improved approach for isolation between pairs of planar antennas and the presently described solution is applicable to repeater apparatus and similar circuits.

SUMMARY

The present disclosure describes m antenna system having two planar, closely positioned antenna elements and a method of element arrangement which provides improved isolation of the element's radiation. The apparatus is applicable to a mobile phone repeater station or similar apparatus. The two planar antenna elements are positioned in a common, plane and a tuned slot element is positioned between them and coupled therewith sharing a common ground plane current thereby maximizing cancellation and minimizing degradation of radiation of the two planar antenna elements. Dimensions of the toned slot element are adjusted to obtain lambda/4 resonance. By creating this resonance and interrupting the E field of the ground plain, it is possible to create a cancellation of the antenna radiated signals which improves isolation of at least 10 db. This allows an amplified system to operate at higher gains without antenna feedback oscillations. This can be obtained in a narrow bandwidth as is applicable to personal, mobile and cellphone telephony. The antenna element arrangement, being planar, is simple in its design and inexpensive to manufacture.

The details of one or more embodiments of these concepts are set forth in the accompanying drawings and the description below. Other features, objects, and advantages of these concepts will be apparent from the description and drawings, and from the claims.

DESCRIPTION OF DRAWINGS

Like reference symbols in the various drawing figures indicate like elements.

DETAILED DESCRIPTION

Figure 1:
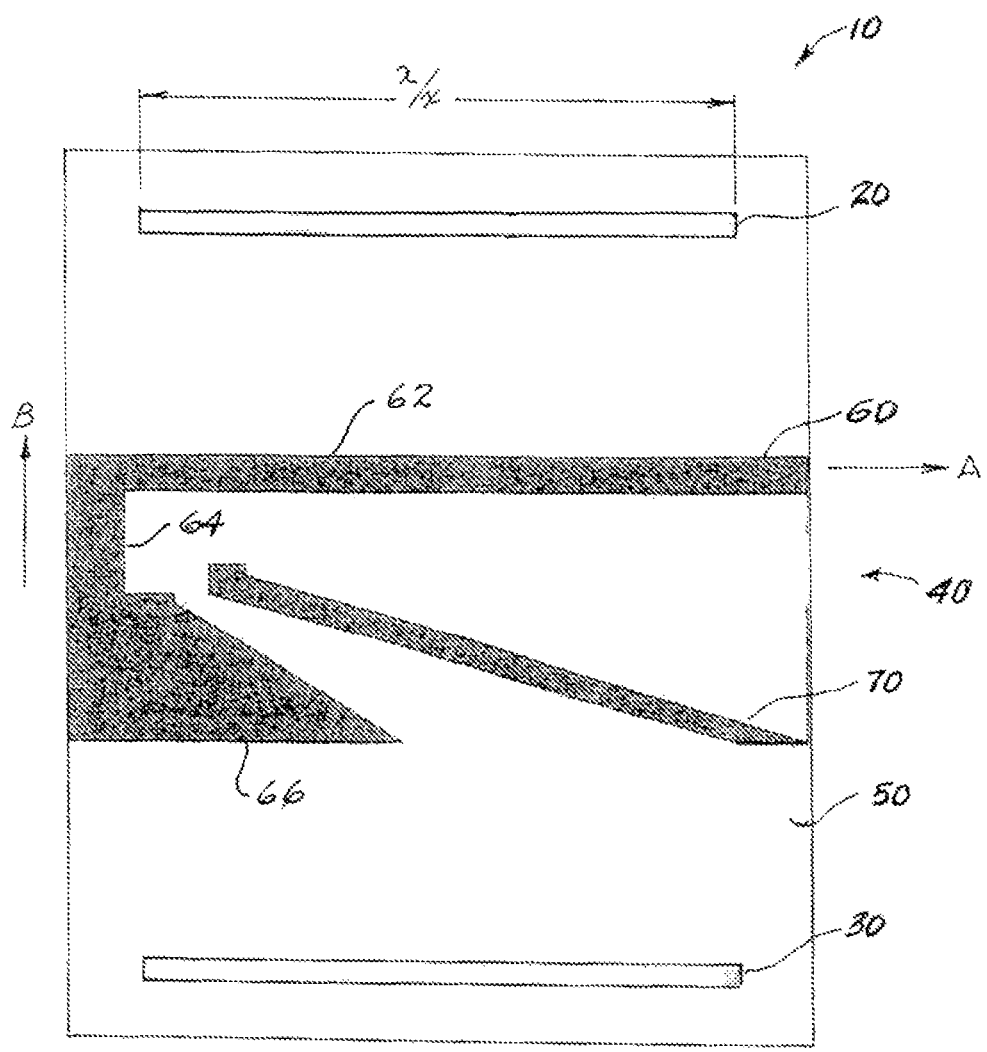
FIG. 1 is an example plan view of a planar antenna system with donor and service antennas shown in opposing positions and a tuned slot ground element medially positioned.
Figure 2:
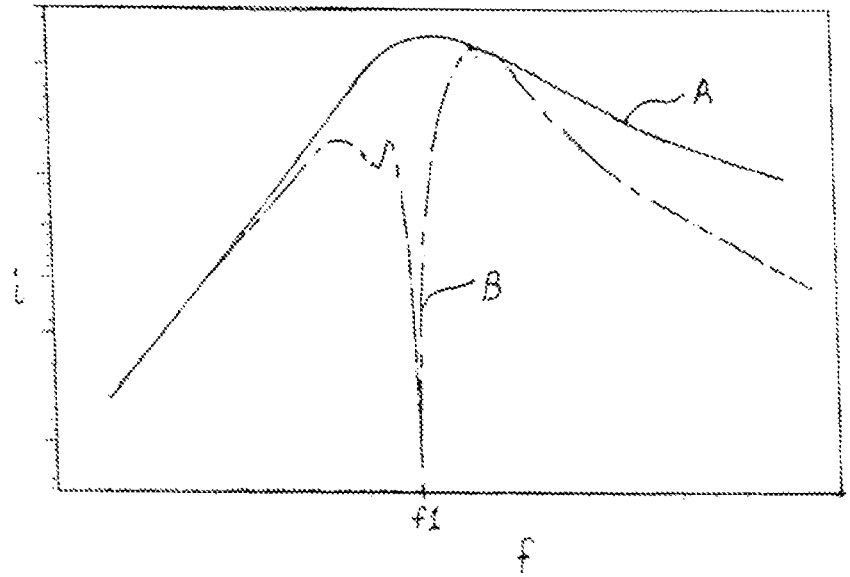
FIG. 2 is an example plot of mutual antenna isolation (i) as a function of frequency (I) of a, received RF signal, with solid line curve "A," without the timed slot element, present, and broken line curve "B," with the tuned slot element present as shown in FIG. 1.
Figure 3:
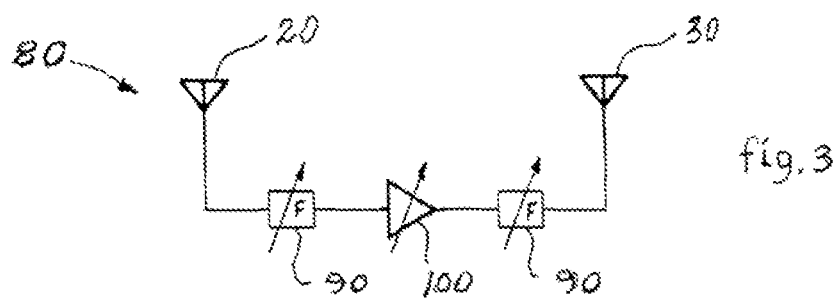
FIG. 3 is an example electric schematic diagram of an RF signal repeater circuit using the donor and service antennas.

FIG. 1 illustrates an antenna system 10 supporting two planar antenna elements 20 and 30 which may be part of the electronic circuit of a cellphone repeater station 80 or similar apparatus shown in FIG. 3. For optimal operation elements 20 and 30 may have a length of lambda/4, 2, or 1. Elements 20 and 30 are part of an antenna system having also a toned slot element 40 positioned between the antenna elements 20, 30, the tuned slot element 40 enabling preferential signal reception by the antenna elements 20, 30 in two selected frequency bands and isolating radiation from each of the antenna elements 20, 30 from each other. The antenna elements 20, 30 and the toned slot element 40 may be planar and may be electrically conductive, and mounted on a dielectric sheet 50. Elements 20, 30, 40 may be covered by a dielectric layer (not shown). The antenna and toned slot elements 20, 30, 40 may be of copper sheer material and she dielectric sheet 50 may be of a glass epoxy substrate material. As shown in FIG. 1, the tuned slot element 40 may have two spaced apart segments, a C-shaped segment 60 and a linear segment 70. The C-shaped segment 60 may have a first linear leg 62 extending in a first direction (arrow A), and a second linear leg 04 extending in a second direction (arrow B), the second direction, may be orthogonal with respect to the first direction. The C-shaped segment 00 may also have a triangular portion 66. The linear segment 70 may be convergent, by its position, on the triangular portion 66 and also on the first linear leg 62.

Spacing between the linear segment 70 and the triangular portion 66 may enable 1900 MHz signal reception by the antenna elements 20, 30 while spacing between the linear segment 70 and the first linear leg 62 may enable 850 MHz signal reception by the antenna elements.

The circuit diagram of FIG. 3 is exemplary of signal repeater 80 applicable to the antenna system 10 described in the foregoing. Such a repeater 80 is a bi-directional amplifier wherein duplex signal traffic is able to be handled and amplified in both uplink and downlink directions simultaneously. In the repeater 80 signals are received at either antenna element 20 or 30, filtered at either voltage controlled tunable filter 90, and amplified at voltage controlled amplifier 100, and retransmitted at the opposite antenna element, either 30 or 20. The filters 90 are adjusted to pass a carrier frequency in one of the bands selectable by the antenna system 10 whereby all other frequencies are rejected. The frequency is the operating signal frequency of a cell phone using repeater 80. The antenna system 10 may be mounted within a cell phone sleeve as described in applications U.S. Ser. No. 13/238,894 and U.S. Ser. No. 13/590,053 and the repeater 80 may be as defined in application Ser. No. 13/591,152.

Embodiments of the subject apparatus and method have been described herein. Nevertheless, it will be understood that various modifications may be made without departing from the spirit and understanding of this disclosure. Accordingly, other embodiments and approaches are within the scope of the following claims.

What is claimed is:

1. An antenna system comprising:
a pair of spaced apart antenna elements;
a tuned slot element positioned between the antenna elements;
wherein the antenna elements and the tuned slot element are of electrically conductive planar copper sheet material mounted on a dielectric sheet of glass epoxy substrate material; and
the tuned slot element has two segments, a C-shaped segment and a linear segment; the tuned slot element enabling signal reception by the antenna elements in two isolated frequency bands.

2. The system of claim 1 wherein the C-shaped segment has a first linear leg extending in a first direction, a second linear leg extending in a second direction, the second direction orthogonal to the first direction, and a triangular portion.

3. The system of claim 2 wherein the linear segment is convergent on the triangular portion and on the first linear leg.

4. The system of claim 2 wherein spacing between the linear segment and the triangular portion enable 1900 MHz signal reception by the antenna elements.

5. The system of claim 3 wherein spacing between the linear segment and the first linear leg enable 850 MHz signal reception by the antenna elements.

* * * * *